(12) United States Patent
Meckler et al.

(10) Patent No.: US 7,400,095 B2
(45) Date of Patent: Jul. 15, 2008

(54) PORTABLE ELECTRIC LIGHTING FIXTURE

(75) Inventors: Peter Meckler, Pommelsbrunn (DE);
Gerhard Endner, Nürnberg (DE);
Thomas Josef Weiss, Roth (DE)

(73) Assignee: Ellenberger & Poensgen GmbH, Altdorf (DE)

(*) Notice: Subject to any disclaimer, the term of this patent is extended or adjusted under 35 U.S.C. 154(b) by 325 days.

(21) Appl. No.: 11/280,628

(22) Filed: Nov. 16, 2005

(65) Prior Publication Data
US 2007/0109773 A1 May 17, 2007

(51) Int. Cl.
*H01J 13/46* (2006.01)
*F21L 4/00* (2006.01)

(52) U.S. Cl. .......................... 315/33; 315/51; 315/291; 362/157

(58) Field of Classification Search ............. 315/209 R, 315/224, 291, 307–308, 312, 3, 51; 362/225, 362/227, 257, 382, 157
See application file for complete search history.

(56) References Cited

U.S. PATENT DOCUMENTS

| | | | | |
|---|---|---|---|---|
| 5,107,180 A | * | 4/1992 | Ormanns et al. | 315/33 |
| 5,734,229 A | * | 3/1998 | Bavaro et al. | 315/86 |
| 6,095,661 A | * | 8/2000 | Lebens et al. | 362/184 |
| 6,831,417 B2 | * | 12/2004 | Baarman | 315/51 |
| 7,019,468 B2 | * | 3/2006 | Deurloo et al. | 315/291 |
| 7,061,188 B1 | * | 6/2006 | Katyl et al. | 315/291 |
| 7,186,007 B1 | * | 3/2007 | Rotwitt | 362/287 |
| 2001/0022723 A1 | * | 9/2001 | Siminovitch et al. | 362/225 |
| 2005/0174782 A1 | * | 8/2005 | Chapman | 362/319 |
| 2005/0185398 A1 | * | 8/2005 | Scannell | 362/227 |
| 2007/0001624 A1 | * | 1/2007 | Blondia | 315/291 |

* cited by examiner

*Primary Examiner*—Thuy Vinh Tran
*Assistant Examiner*—Tung X Le
(74) *Attorney, Agent, or Firm*—Laurence A. Greenberg; Werner H. Stemer; Ralph E. Locher

(57) ABSTRACT

A portable electrical luminaire (1) having a supporting body (2) having an upper support end (2a) and having a lower support end (2b), having a lamp base (3) arranged on the upper support end (2a) for accommodating a luminous means (4), having a reflector (5) surrounding the lamp base (3) for indirect space illumination purposes, having a connection line (7) which is electrically connected to the lamp base (3) and having a connection plug (8) for connection to a power supply system ($U_{AC}$), and having an electronic control device (11), which is designed to automatically limit the electrical power (P(t)) drawn from the power supply system ($U_{AC}$) by the luminous means (4) to a predetermined value ($P_{max}$).

16 Claims, 4 Drawing Sheets

PORTABLE ELECTRIC LIGHTING FIXTURE

BACKGROUND OF THE INVENTION

1. Field of the Invention

The invention relates to a portable electrical luminaire having a supporting body and having a reflector surrounding a lamp base for indirect space illumination purposes. It also relates to an electronic control device for such a luminaire.

2. Summary of the Invention

Such a portable electrical luminaire is known as a standard lamp or uplighter (torchiere lamp). In particular in the case of an uplighter or torchiere lamp, the portable electrical luminaire has, for example, a shell-shaped reflector which can be closed towards the floor of a room and open towards the ceiling of the room. As a result, a luminous means surrounded by the reflector and inserted in a lamp base produces upwardly or downwardly directed light radiation and thus indirect illumination. A halogen lamp is mainly used as the luminous means.

Such an uplighter generally has a supporting body in the form of a standard. The lamp base surrounded by the reflector for accommodating the luminous means is held on the upper standard or support end. An electrical line connected to the lamp base is passed over or through the supporting body in the form of a standard to its lower support end, on which a stand is provided for achieving the required stability for the luminaire. The connection cable, which is passed out in the region of the lower support element or stand, has a connection plug at one end which can be inserted into a power supply outlet, which is for its part electrically connected to a power supply system, for the purpose of supplying power to the luminous means. The power supply system provides, for example, an AC voltage of 120 V at a system frequency of 60 Hz.

The luminaire can have, in particular in the region of the connection cable, a switch and/or a dimmer in order to switch the illumination on and off manually or to adjust the luminous intensity manually by means of the dimmer. The uplighter can also have one or more further lamps, in particular a reading lamp, which can then be switched on and off manually using a separate switch and/or by means of a dimmer or whose luminous intensity can be adjusted manually.

The invention is based on the object of making it possible with such a luminaire or uplighter to limit the power using very simple means. In addition, a potential risk of fire should be prevented in a simple manner, in particular for the case in which a halogen lamp having an impermissibly high power is used as the luminous means.

This object is achieved according to the invention by the features of claim 1. In this regard, an electronic control device is provided which is integrated in the luminaire. This control device is designed to automatically limit the electrical power drawn from the power supply system by the luminous means to a predetermined value.

In accordance with one advantageous variant of the electronic control device, it has first means for detecting an actual current or load current. This presently detected actual current and the present actual voltage, which corresponds, for example, to a supply voltage of 120 V, is used to determine the electrical power presently drawn by the luminaire. The electronic control device uses a comparison of the power value, derived from the actual current and from the actual voltage, with a, for example, voltage-compensated reference value to limit the actual current such that the electrical power drawn by the luminaire is less than or equal to a maximum power value, in particular less than or equal to 190 W. Voltage compensation is not required for a less precise power measurement.

In one preferred embodiment, the electronic control device comprises a measurement sensor, in particular a current sensor, for measuring a power parameter. Furthermore, the electronic control device comprises a comparator, which is supplied on the input side with the value or parameter detected by the measurement sensor and a reference value. The comparator is connected on the output side to a controllable switch or switch component, for example to a MOSFET (MOS field-effect transistor) as a power semiconductor, or to a relay. The lamps or luminous means of the luminaire are disconnected by means of the relay when the maximum power value is reached and switched on again when it is undershot.

However, the electronic control device preferably comprises a controllable electronic switch in the form of a power semiconductor which can be triggered, preferably a triac, a thyristor or a GTO thyristor (gate turn-off thyristor). In this case, a triac is in principle a parallel circuit comprising two thyristors for controlling the two half-waves of an AC voltage using a single component. A thyristor is understood to mean a controllable rectifier in the form of a semiconductor. A GTO thyristor, in a corresponding manner to a conventional thyristor, can be switched on with a positive voltage pulse at the control input. In contrast to a conventional thyristor, the GTO thyristor can, however, also be switched off by means of a negative voltage pulse. This additional disconnection option simplifies the driving electronics in the case of a GTO thyristor.

In one expedient development, the electronic control device has an electronic amplifier having an amplifier input connected to the measurement sensor and having an amplifier output connected to the first comparator input. In addition, the controllable electronic switch, i.e. the triac, thyristor or GTO thyristor, is expediently connected to a dimmer circuit for automatically adjusting the maximum electrical power supplied to the luminous means. The power is thus expediently limited by means of phase-gating or phase-chopping control. The dimmer circuit can also be operated manually in order, if necessary, to adjust the luminous intensity of the luminous means and thus the desired brightness of the luminaire.

The electronic control device can be arranged within the luminaire between the lamp base and the connection plug of the connection cable. Accordingly, the electronic control device is, if necessary, arranged in the supporting body, in the lamp base, in the connection line or in the connection plug. Within the supporting body, the electronic control device can be fitted into its stand or into the usually vertical or upright standard.

The electronic control device can also be arranged in a separate adapter. This adapter is then designed to be plugged onto the connection plug of the luminaire and to be inserted, together with said connection plug, into a conventional power supply outlet. The adapter containing the electronic control device has, for this purpose, connection pins which are suitable for the dimensions of the connection plug and correspond to the customary connection sockets of a conventional power supply outlet. The use of such an adapter having an integrated electronic control device for limiting the power of the luminaire or the uplighter is particularly suitable for retrofitting an already existing uplighter.

Exemplary embodiments of the invention will be explained in more detail below with reference to a drawing, in which:

BRIEF DESCRIPTION OF THE DRAWINGS

Mutually corresponding parts are provided with the same references in all of the figures.

DESCRIPTION OF THE PREFERRED EMBODIMENTS

Figure 1:
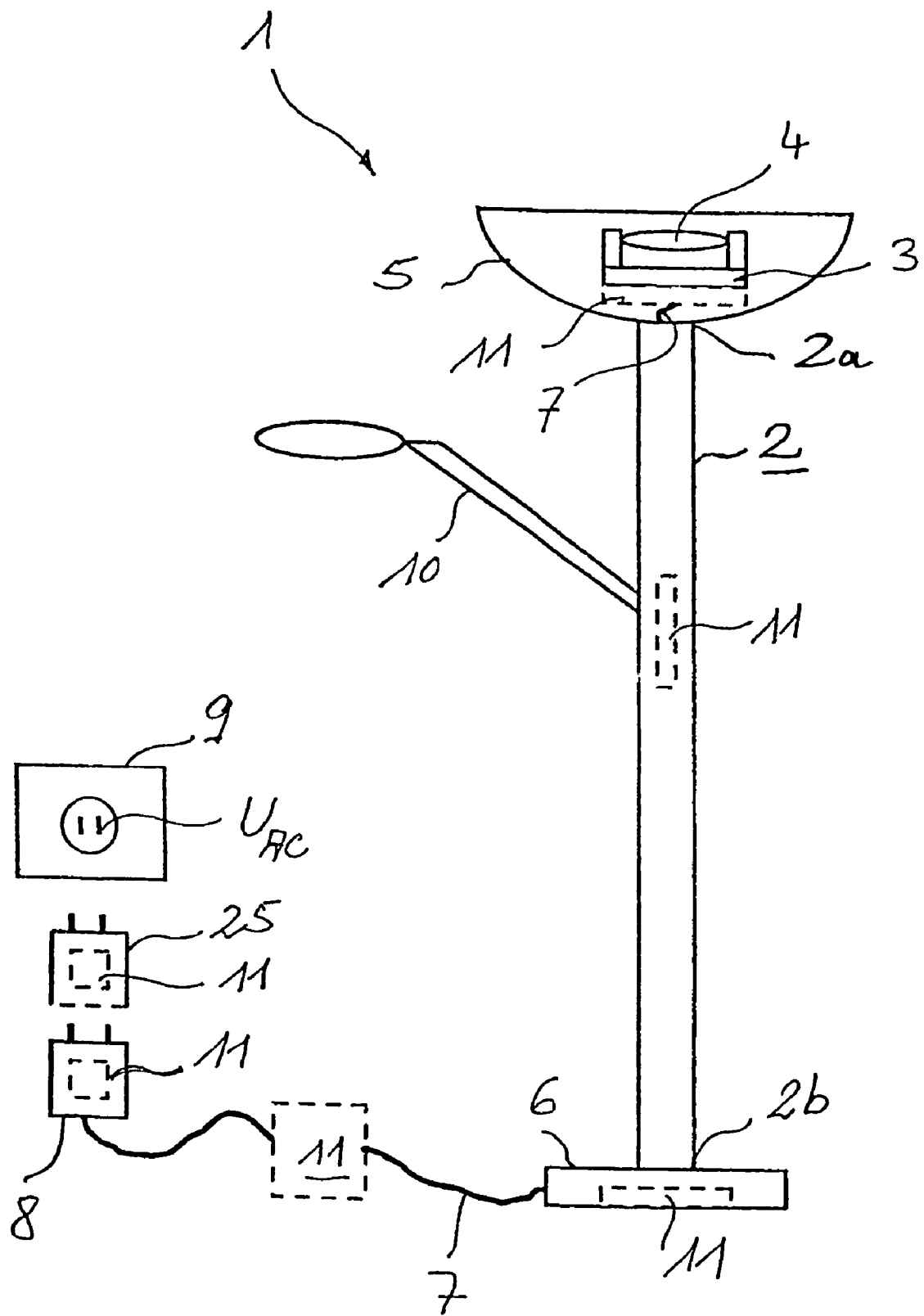
FIG. 1 shows a schematic of an uplighter as a portable electrical luminaire having an electronic control device for power limitation purposes.

FIG. 1 shows a schematic of an uplighter 1 as a luminaire having a supporting body 2 (also referred to below as a standard) having an upper support end 2a and having a lower support end 2b. A lamp base 3 for accommodating a luminous means 4, in particular a halogen lamp, is provided on the upper support end 2a. The lamp base 3 is surrounded by a shell-like reflector 5 which is open at the top and closed at the bottom and is held on the upper support end 2a of the standard 2. The reflector 5 makes possible indirect space illumination by the light produced by the luminous means 4 being directed essentially upwards by means of the reflector 5.

A stand 6 is provided on the lower support end 2b of the standard 2. A connection cable 7 which is passed out of the standard 2 on or over this stand 6 is passed with one cable end to a connection plug 8, while the other cable end of the connection cable 7 is passed over or through the standard 2 to the lamp base 3 and electrically connected there. By inserting the connection plug 8 into a power supply outlet 9, a current flows through the luminous means 4 such that—possibly by operating a switch—the luminaire 1 is switched on.

In addition, a further lamp 10, for example a reading lamp, can be provided on the side of the standard 2. This lamp 10 can be provided, in a manner not illustrated in any more detail, with a conventional luminous means, for example with an incandescent lamp, a halogen lamp or an energy-saving lamp. The uplighter 1 also has an electronic control device 11. This electronic control device 11 integrated in the uplighter 1 is provided physically in the region of the connection cable 7, in the connection plug 8, in the standard 2, in the stand 6 or in the region of the lamp base 3.

With the connection plug 8 inserted into the power supply outlet 9, the uplighter 1 is supplied a system voltage $U_{AC}$ of, for example, 120 V at 60 Hz. The electronic control device 11 in this case serves the purpose of limiting the power of the uplighter 1 such that the electrical power (P) drawn from the power supply system via the power supply outlet 9 does not exceed a predetermined power value $P_{max}$. This predetermined maximum power value $P_{max}$ is less than 200 W, preferably 190 W.

The electronic control device 11 comprises a sensor 12 for detecting the present actual current I(t). This present current value I(t) is supplied to control electronics 13. Furthermore, a sensor 14 detects the present voltage value U(t) which is U=120 V at a constant supply voltage. The control electronics determine the present power value P(t), and thus the electrical power P presently drawn by the luminous means 4, from these two present parameters I(t) and U(t) using the relationship P(t)=U(t)×I(t). If the further lamp 10 is connected by means of a manually operable switch 15, the present power value P(t) would correspondingly increase.

The control electronics 13 are connected on the output side to power electronics 16 which for their part are connected to the luminous means 4 via a switch 17 and a dimmer circuit 18. The control electronics 13 use a comparison of the presently determined power value P(t) with a reference or threshold value to produce a control signal S for the power electronics 16. If a specific threshold or power value is reached or exceeded, the current $I_L(t)$ supplied to the luminous means 4 is adjusted by means of the driving of the power electronics 16 such that the total power $P_S(t)$ drawn by the luminous means 4, 16 does not exceed the predetermined power value P of, for example, 190 W.

Once the uplighter 1 has been switched on, the power P drawn from the power supply system by the uplighter 1 is automatically limited to $P_L$=190 W. At a constant supply voltage of $U_{AC}$=120 V, the current flowing through the luminous means 4, 16 is thus limited to $I_L=P_L/U_{AC}$=1.583 A.

Figure 2:
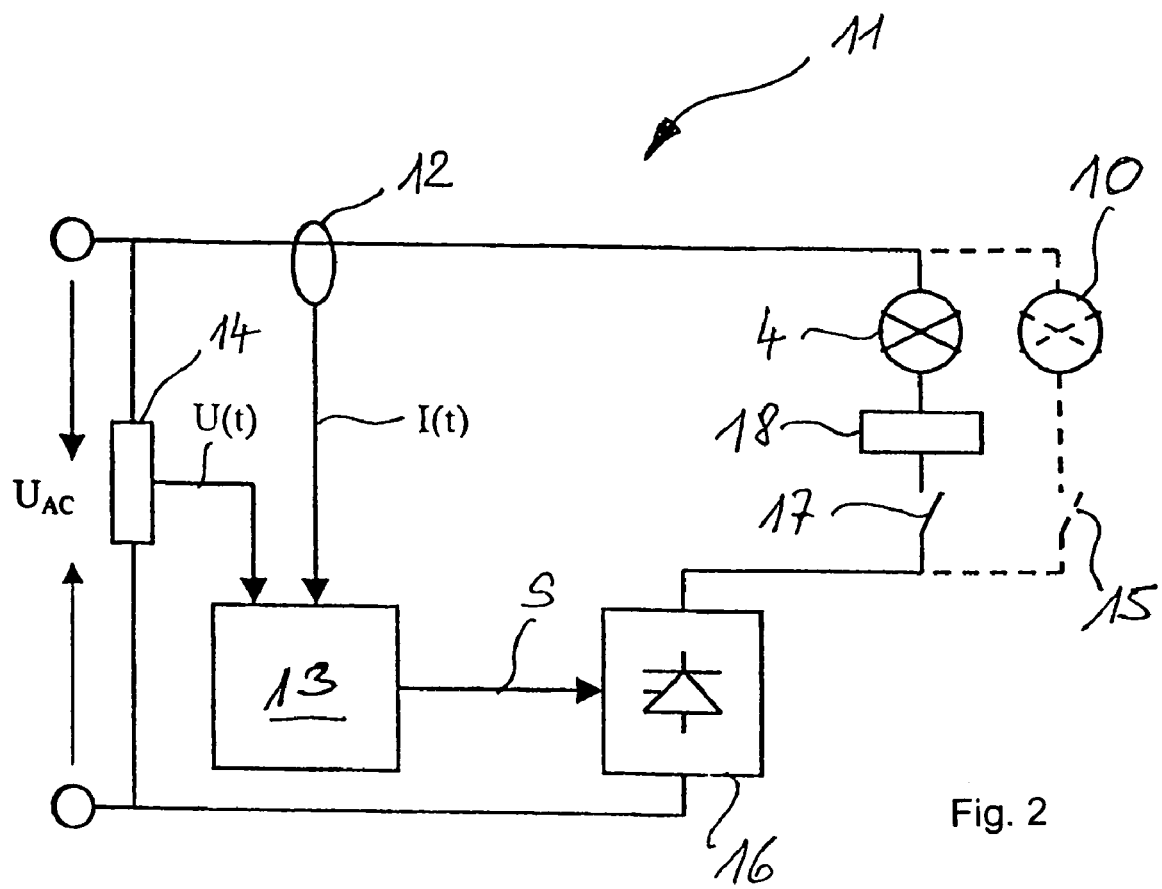
FIG. 2 shows the basic design of the electronic control device for power limitation purposes.
Figure 3:
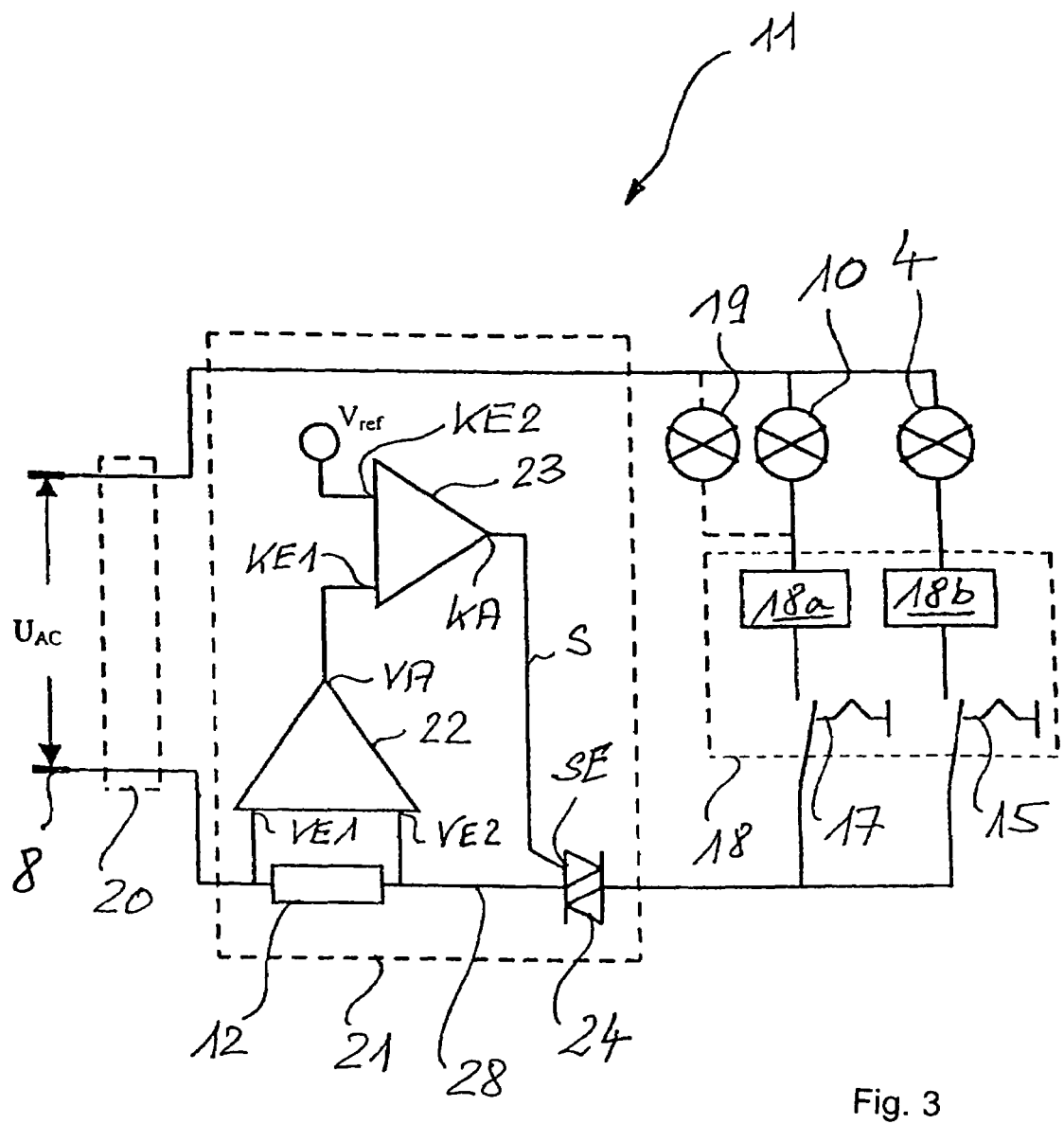
FIG. 3 shows the electronic control device for power limitation purposes having a power regulator and a dimmer circuit for a number of luminous means of the luminaire.

One further embodiment of the electronic control device 11 for power limitation is illustrated schematically in FIG. 3. In contrast to the embodiment shown in FIG. 2, a further luminous means 19 is depicted here in addition to the reading lamp 10, with the result that, in addition to the luminous means 4 in the form of the halogen lamp, a further lamp 10 or else two further lamps 10, 19 on the uplighter 1 can optionally be switched on or off in this embodiment. A manually operable dimmer circuit 18 in turn makes it possible to manually adjust the luminous intensity of the individual luminous means 4, 10 and/or 19.

The electronic control device 11 shown in FIG. 3 can have a filter module 20. This filter module 20 prevents a reaction on the power supply system. The electronic control device 11 also has a power regulator 21. This power regulator 21 comprises a current sensor 12 and an amplifier module 22. The two inputs VE1 and VE2 of the amplifier module 22 are connected to the current sensor 12. The output VA of the amplifier module 22 is connected to a first input KE1 of a comparator 23. A reference value $V_{ref}$ is passed to the second comparator input KE2.

The output KA of the comparator 23 is passed to a control input SE (gate) of an electronic switch 24. This switch 24 can be a thyristor, a triac or a GTO thyristor. The electronic switch 24 is connected on the output side to the dimmer circuit 18. The electronic switch 24 can also be connected on the output side directly to the luminous means 4, 10 and/or 19.

The dimmer circuit 18 comprises manually operable switches 15, 17 and manually operable dimmers 18a, 18b for manually adjusting the luminous intensity of the luminous means 4 or 16 and/or 19. The dimmer circuit 18 or the luminous means 4, 10 and/or 19 is/are driven by means of phase-gating or phase-chopping control.

The comparator 23 produces a control signal S from a comparison of the present actual current I(t), which has been detected by the current sensor 12 and amplified via the amplifier module 22, with the preferably voltage-compensated reference value $V_{ref}$. The electronic switch 24 is driven by means of this control signal S such that the power P(t) drawn from the power supply system by the uplighter 1 is automatically regulated down to the maximum power value $P_{max}$=190 W if the presently measured current I(t) exceeds an absolute value which is above the computationally permissible power $P_{max}=U*I_{max}$.

The control circuit 11 can also be integrated in an additional adapter 25. This adapter 25 is then plugged onto the connection plug 8 in the operating state of the uplighter 1 such that said connection plug 8 can be inserted into the power supply outlet 9 via the adapter 25. The adapter 25 with the integrated electronic control device 11 is therefore particularly suitable for retrofitting an uplighter 1 in order to automatically limit its power to the predetermined power value $P_{max}$.

Figure 4:
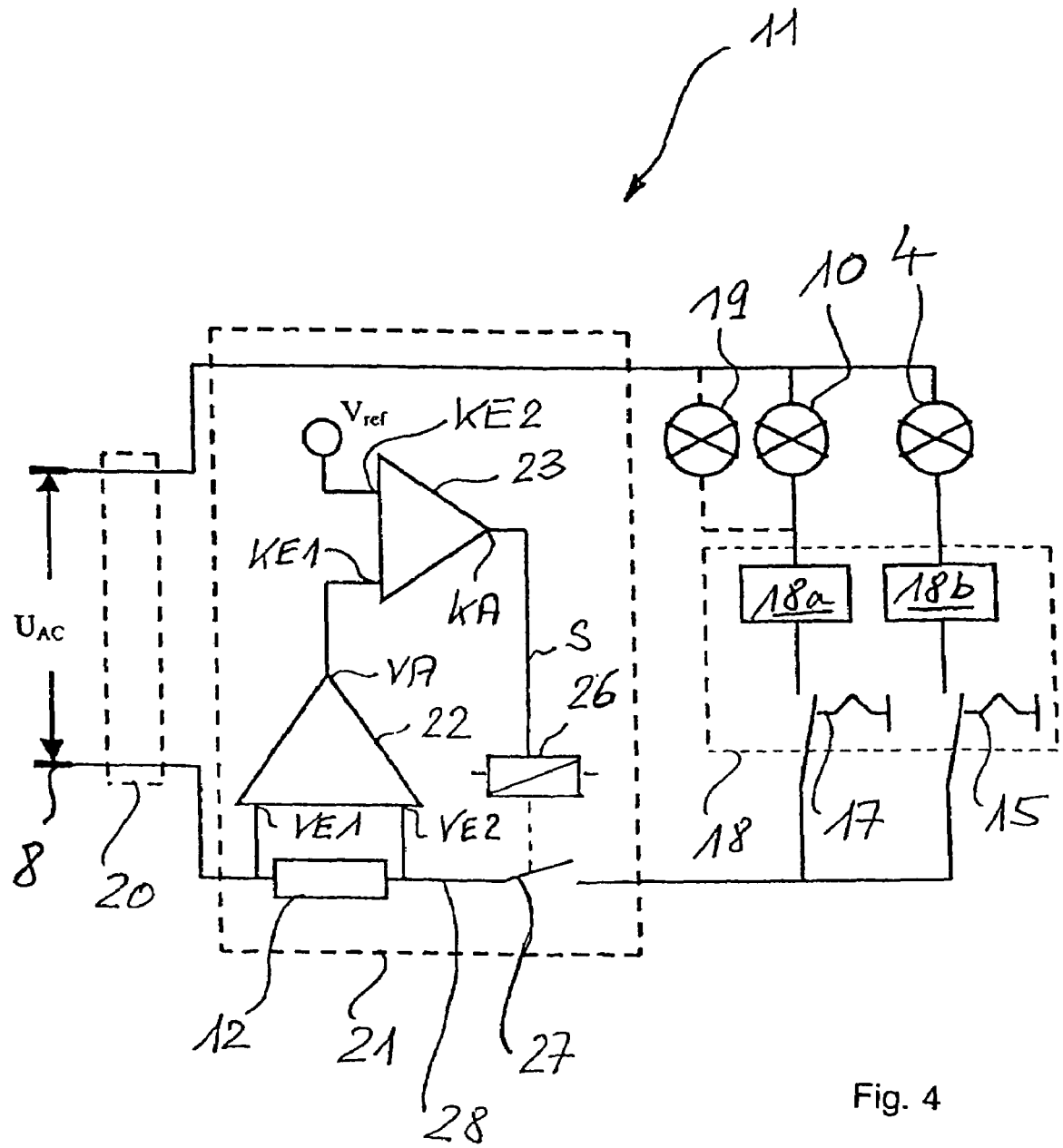
FIG. 4 shows a detail of the electronic control device shown in FIG. 3 having a relay for disconnecting the luminous means.

As shown in FIG. 4, a relay 26 can also be provided in place of the electronic switch 24 in the form of a triac or a thyristor, this relay 26 then likewise being driven by the comparator 23. The luminous means 4, 10 and 19 are disconnected by means of the relay 26 if the electrical power P(t) drawn by them exceeds the predetermined maximum power value $P_{max}$.

If the power value $P_{max}$ is undershot again, the luminous means 4, 10 or 19 are switch on again. For this purpose, the relay 26 is connected or coupled to a switch 27 which is situated, for example, in that current path 28 in which the current sensor 12 and, in the exemplary embodiment shown in FIG. 3, the electronic switch 24 are also provided.

The invention claimed is:

1. A portable electrical luminaire, comprising:
    a supporting body having an upper support end and a lower support end;
    a lamp base disposed on said upper support end and configured to accommodate a luminous device;
    a reflector surrounding said lamp base for indirect space illumination;
    an electrical connection between said lamp base and a connection plug for connecting to a power supply system; and
    an electronic control device connected and configured to automatically limit an electrical power drawn by said luminous device from the power supply system to a predetermined power value, said electronic control device including first means for detecting an actual current and second means configured to use a comparison of a power value, derived from the actual current and from an actual voltage, with a reference value to limit the actual current such that the electrical power drawn is less than or equal to a maximum power value.

2. The portable electrical luminaire according to claim 1, which further comprises an additional luminous device for direct space illumination purposes.

3. The portable electrical luminaire according to claim 1, wherein said electronic control device is disposed in said supporting body, in said lamp base, in said electrical connection line, or in said connection plug.

4. The portable electrical luminaire according to claim 1, wherein said electronic control device is disposed in an adapter configured to be placed onto said connection plug.

5. The portable electrical luminaire according to claim 1, wherein said electronic control device is configured to regulate the electrical power down to a maximum power value of less than 200 W.

6. The portable electrical luminaire according to claim 1, wherein said electronic control device is configured to regulate the electrical power down to a maximum power value of less than 190 W.

7. The portable electrical luminaire according to claim 1, wherein said electronic control device is configured to limit the power by a phase-gating control process or a phase-chopping control process.

8. A portable electrical luminaire, comprising:
    a supporting body having an upper support end and a lower support end;
    a lamp base disposed on said upper support end and configured to accommodate a luminous device;
    a reflector surrounding said lamp base for indirect space illumination;
    an electrical connection between said lamp base and a connection plug for connecting to a power supply system; and
    an electronic control device connected and configured to automatically limit an electrical power drawn by said luminous device from the power supply system to a predetermined power value, said electronic control device including:
    a sensor for measuring a power parameter;
    a comparator having a first comparator input connected to said sensor, a second comparator input for supplying a reference parameter, and a comparator output; and
    a controllable switch connected to said comparator output.

9. The portable electrical luminaire according to claim 1, wherein said sensor is a current sensor for measuring an actual current.

10. The portable electrical luminaire according to claim 1, wherein said electronic control device further comprises a voltage divider for measuring an actual voltage.

11. The portable electrical luminaire according to claim 8, wherein said electronic control device includes an electronic amplifier with an amplifier input connected to said sensor and an amplifier output connected to said first comparator input.

12. The portable electrical luminaire according to claim 8, wherein said controllable switch has an output connected to a dimmer circuit for adjusting the electrical power supplied to said luminous means.

13. The portable electrical luminaire according to claim 8, wherein said controllable switch includes a relay for turning off said luminous device when the predetermined power value is reached.

14. The portable electrical luminaire according to claim 8, wherein said luminous device is one of a plurality of luminous devices, and said controllable switch includes a relay for turning off each of said luminous device when the predetermined power value is reached.

15. The portable electrical luminaire according to claim 8, wherein said controllable switch is a power semiconductor.

16. The portable electrical luminaire according to claim 15, wherein said controllable switch is a thyristor or a triac.

* * * * *